United States Patent Office 3,086,054
Patented Apr. 16, 1963

3,086,054
BIS(DIALKYLPHOSPHINO)ACETYLENES AND 1:2-BIS(DIALKYLPHOSPHINO)ETHYLENES
Joseph Chatt, St. Albans, Frank Alan Hart, Welwyn Garden City, and Harold Crosbie Fielding, Northwich, England, assignors to Imperial Chemical Industries Limited, London, England, a corporation of Great Britain
No Drawing. Filed Mar. 6, 1959, Ser. No. 797,601
Claims priority, application Great Britain Mar. 14, 1958
11 Claims. (Cl. 260—606.5)

This invention relates to new aliphatic organic diphosphines and to a new process for their manufacture.

1:2-bis(diethylphosphino)ethane, $Et_2PCH_2$—$CH_2PEt_2$, is known and has been made by a reaction between sodium diethyl phosphide and ethylene dichloride, but bis(diethylphosphino)acetylene, $Et_2PC\equiv CPEt_2$, and 1:2-bis(diethylphosphino)ethylene, $Et_2PCH\!=\!CHPEt_2$, and their homologues have hitherto not been known.

It is one object of the present invention to provide bis(dialkylphosphino)acetylenes and 1:2-bis(dialkylphosphino)ethylenes as new products. It is a further object of the invention to provide a process for making bis(dialkylphosphino)acetylenes, from which 1:2-bis(dialkylphosphino)ethylenes and 1:2-bis(dialkylphosphino)ethanes may be obtained by reduction, for example, with hydrogen and Raney nickel.

According to our invention we provide bis(dialkylphosphino)acetylenes and 1:2-bis(dialkylphosphino)-ethylenes as new forms of matter; we also provide a process for making bis(dialkylphosphino)acetylenes by reacting dialkylhalophosphines with acetylene-metallo compounds, for example acetylene dimagnesium bromide, and a process for reducing bis(dialkylphosphino)acetylenes to 1:2-bis(dialkylphosphino)ethanes.

Dialkylhalophosphines may be prepared by a two-stage reaction. In the first stage a phosphorus trihalide is reacted with a tetraalkyl lead to give an alkyldihalophosphine. An example of this stage in respect of ethyl dichlorophosphine is described in the Journal of Organic Chemistry (1949), 14, 429. In the second stage the alkyldihalophosphine after isolation is reacted with a further amount of the tetraalkyl lead; an example of this in respect of diethylchlorophosphine is given in the Journal of the Chemical Society, 1951, 411.

Acetylene dimagnesium bromide may be obtained by the reaction between acetylene and ethyl magnesium bromide in an inert solvent; ethane is formed at the same time. It is convenient not to isolate the acetylene dimagnesium bromide from the reaction mixture but to add the dialkylhalophosphine to the latter. It is important to exclude oxygen and moisture from any reaction in which dialkylhalophosphines are taking part since some of them are spontaneously inflammable and most are readily hydrolysed and rapidly oxidised. Other acetylene-metallo compounds that may be used include acetylides, for example sodium acetylide, calcium acetylide.

Examples of bis(dialkylphosphino)acetylenes that can be made by the process of our invention include bis(dimethylphosphino)acetylene; bis(diethylphosphino)acetylene; bis(dipropylphosphino)acetylene; bis(diisopropylphosphino)acetylene; bis(dibutylphosphino)acetylene. In these the two alkyl groups, R,R attached to each phosphorus atom are the same and the general formula may be expressed as

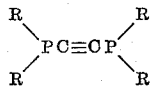

but by using dialkyl halophosphines in which the two alkyl groups are different the process may also be used to provide bis(dialkylphosphino)acetylenes having the general formula

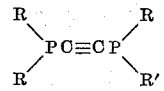

in which different alkyl groups, R,R', are attached to the phosphorus atom, for example bis(methylethylphosphino)acetylene.

In the first of the three following examples, which illustrate the invention but do not restrict it, the preparation of bis(diethylphosphino)acetylene is described; the second describes the partial hydrogenation of bis(diethylphosphino)acetylene to give 1:2-bis(diethylphosphino)-ethylene, and the third describes its complete hydrogenation to give 1:2-bis(diethylphosphino)ethane.

The bis(dialkylphosphino)acetylenes and 1:2-bis(dialkylphosphino)ethylenes of our invention are useful as intermediate compounds in the preparation of 1:2-bis(dialkylphosphino)ethanes. The latter after oxidation to the corresponding diphosphine oxides have the property of co-ordinating with metals and consequently may be used for extracting metals from solutions of their salts, and for purifying powdered metals.

Example 1

175 gm. of ethyl bromide in 160 ml. of tetrahydrofuran was added dropwise to 39.0 gm. of magnesium in 960 ml. of tetrahydrofuran in a 5-litre flask, with stirring, the flask being cooled with cold water.

Acetylene was then bubbled through narrow bore tubes into the reaction mixture at a rate of ca. 15 litres/hr. for 3 hours, with stirring and cooling in cold water.

200 gm. of diethylchlorophosphine in 70 ml. of tetrahydrofuran was added dropwise under nitrogen, with stirring, the reaction being cooled with cold water. This gave a clear solution. The reaction was kept under nitrogen throughout the succeeding stages of the preparation.

660 ml. of saturated solution of ammonium chloride was added slowly with stirring and cooling, then a further 800 ml. of water.

The solvent layer was blown over into a 2-litre flask with nitrogen. The aqueous layer was washed with three lots of 150 ml. of benzene and added to the tetrahydrofuran solution.

The solvent was taken off at the water-pump at 30°–40°, leaving ca. 150 ml. of residue. This was fractionally distilled and a fraction collected at 54° and 0.07 mm. Hg. The yield was ca. 100 gm.

|  | Percent C | Percent H |
|---|---|---|
| Found | 59.02 | 9.92 |
| Required for $Et_2PC\equiv CPEt_2$ | 59.39 | 9.97 |

Example 2

19.3 gm. of bis(diethylphosphino)acetylene was placed with 3 gm. of stabilised Raney nickel freshly made up under nitrogen, and 50 ml. of ethyl alcohol in a 500 ml. two-necked, round-bottomed flask, previously swept out with hydrogen. The flask was held by a mechanical shaker, connected to a supply of hydrogen in a granulated aspirator, whilst with vigorous shaking 2.14 litres of hydrogen were absorbed in 1¾ hours. The mixture was filtered through a sintered funnel under nitrogen and the alcohol distilled off. The product was fractionally distilled in vacuo, and a fraction boiling at 67–69° C. under a pressure of 0.03 mm. of mercury was collected and redistilled at 67°–67.5° C. The yield was 11.1 gm. (57%).

|  | Percent C | Percent H |
|---|---|---|
| Found | 58.99 | 10.83 |
| Required for $Et_2PCH=CHPEt_2$ | 58.80 | 10.86 |

*Example 3*

19.3 gm. of bis(diethylphosphino)acetylene was placed in a 500 ml. two-necked round-bottomed flask under hydrogen on a mechanical shaker. 2 gm. of Raney nickel, freshly made up under nitrogen, was added with 50 ml. of ethyl alcohol and the shaker set in vigorous motion. Hydrogen was admitted to the flask from an aspirator (graduated). 2.73 litres of hydrogen were absorbed in 15 hours, the rate of absorption gradually decreasing throughout. A further 2 gm. of nickel and 20 ml. of ethyl alcohol were added and vigorous shaking continued. 4.355 litres of hydrogen were absorbed in 26 hours. The product was filtered under nitrogen through a sintered glass funnel, giving a dark brown liquid, from which the alcohol was distilled and the residue fractionally distilled in vacuo and a fraction weighing 11.7 gm. collected at 62–65° under a pressure of $8 \times 10^{-3}$ mm. of mercury. Traces of oxide appeared in the condenser. The product was redistilled and a fraction boiling at 56–57° under a pressure of $1 \times 10^{-3}$ mm. of mercury collected. The yield was 10.06 gm. (52%).

|  | Percent C | Percent H |
|---|---|---|
| Found | 58.16 | 11.52 |
| Required for $Et_2PCH_2—CH_2PEt_2$ | 58.19 | 11.72 |

What we claim is:

1. A member of the group consisting of bis(dialkylphosphino)acetylenes having the formula

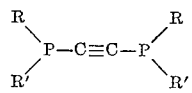

and 1:2-bis(dialkylphosphino)-ethylenes having the formula

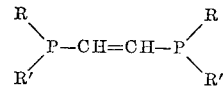

in which R and R' represent alkyl groups.

2. Bis(dimethylphosphino)acetylene.
3. Bis(dipropylphosphino)acetylene.
4. Bis(diisopropylphosphino)acetylene.
5. Bis(dibutylphosphino)acetylene.
6. A compound of the general formula $$R_2PCH=CHPR_2$$

wherein each R is alkyl.

7. Bis(diethylphosphino)acetylene.
8. 1:2-bis(diethylphosphino)ethylene.
9. Process for making bis(dialkylphosphino)acetylenes comprising reacting a dialkyl halophosphine with an acetylene magnesium compound.
10. Process for making bis(diethylphosphino)acetylene comprising reacting diethylchlorophosphine with acetylene dimagnesium bromide.
11. Process for making 1:2-bis(dialkylphosphino)-ethylenes comprising reducing the corresponding bis(dialkylphosphino)acetylenes with hydrogen and a nickel catalyst.

No references cited.